US012744229B2

(12) United States Patent
Park et al.

(10) Patent No.: US 12,744,229 B2
(45) Date of Patent: Sep. 22, 2026

(54) POLYMER ELECTROLYTE MEMBRANE, MANUFACTURING METHOD THEREFOR, AND ELECTROCHEMICAL DEVICE COMPRISING SAME

(71) Applicant: KOLON INDUSTRIES, INC., Seoul (KR)

(72) Inventors: Junghwa Park, Seoul (KR); Donghoon Lee, Seoul (KR); Nayoung Kim, Seoul (KR); Eunsu Lee, Seoul (KR); Hyesong Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 802 days.

(21) Appl. No.: 17/769,763

(22) PCT Filed: Dec. 23, 2020

(86) PCT No.: PCT/KR2020/018956
§ 371 (c)(1),
(2) Date: Apr. 18, 2022

(87) PCT Pub. No.: WO2021/133045
PCT Pub. Date: Jul. 1, 2021

(65) Prior Publication Data

US 2023/0006231 A1 Jan. 5, 2023

(30) Foreign Application Priority Data

Dec. 27, 2019 (KR) ........................ 10-2019-0175918

(51) Int. Cl.
*H01M 8/1048* (2016.01)
*H01M 8/1062* (2016.01)
*H01M 8/1081* (2016.01)
*H01M 8/10* (2016.01)

(52) U.S. Cl.
CPC ....... *H01M 8/1048* (2013.01); *H01M 8/1062* (2013.01); *H01M 8/1081* (2013.01); *H01M 2008/1095* (2013.01); *H01M 2300/0082* (2013.01)

(58) Field of Classification Search
CPC ............. H01M 8/1048; H01M 8/1062; H01M 8/1081; H01M 2008/1095; H01M 2300/0082
See application file for complete search history.

(56) References Cited

U.S. PATENT DOCUMENTS

2006/0046134 A1 3/2006 Cho

FOREIGN PATENT DOCUMENTS

| | | | |
|---|---|---|---|
| CN | 101015081 | A | 8/2007 |
| CN | 102477162 | A | 5/2012 |
| CN | 108779275 | A | 11/2018 |
| EP | 3998662 | A1 | 5/2022 |
| JP | 2004247155 | A | 9/2004 |
| JP | 2005-285450 | A | 10/2005 |
| JP | 2006261043 | A | 9/2006 |
| JP | 2008135399 | A | 6/2008 |
| JP | 2010180408 | A | 8/2010 |
| KR | 20060020282 | A | 3/2006 |
| KR | 20150070577 | A | 6/2015 |
| KR | 10-2017-0089335 | A | 8/2017 |
| KR | 102018323 | B1 | 9/2019 |

OTHER PUBLICATIONS

JP2004247155A. Sep. 2, 2004. English machine translation by EPO. (Year: 2004).*
KR20150070577A. Jun. 25, 2015. English machine translation by EPO. (Year: 2015).*
The office action dated Apr. 14, 2023 related to the corresponding Japanese Patent application.
Satbyul Park et al_ACS_Omega.
The office action dated Jan. 24, 2025 related to the corresponding Chinese Patent application.
the search report dated Apr. 10, 2025 related to the corresponding European Patent Application.
the office action dated Jul. 26, 2025.

* cited by examiner

*Primary Examiner* — James Lee
(74) *Attorney, Agent, or Firm* — Harvest IP Law, LLP

(57) ABSTRACT

Disclosed are a polymer electrolyte membrane having high flexibility, high ionic conductivity, and excellent mechanical durability, a method for manufacturing same, and an electrochemical device comprising same. The polymer electrolyte membrane of the present invention comprises a polymer electrolyte material, wherein the polymer electrolyte material comprises: an ion conductor having an ion-exchange group; and an organic compound which binds to the ion-exchange group via an ionic bond or a hydrogen bond, thereby allowing the polymer electrolyte material to have an ionic crosslink structure or a hydrogen bond crosslink structure.

14 Claims, No Drawings

POLYMER ELECTROLYTE MEMBRANE, MANUFACTURING METHOD THEREFOR, AND ELECTROCHEMICAL DEVICE COMPRISING SAME

CROSS REFERENCE TO RELATED APPLICATIONS

This application is a National Stage of International Application No. PCT/KR2020/018956 filed Dec. 23, 2020, claiming priority based on Korean Patent Application No. 10-2019-0175918 filed Dec. 27, 2019, the disclosures of which are incorporated herein by reference in their entireties.

TECHNICAL FIELD

The present disclosure relates to a polymer electrolyte membrane, a method for manufacturing the same, and a membrane electrode assembly including the same, and more particularly to a polymer electrolyte membrane having excellent flexibility, high ionic conductivity, and superior mechanical durability, a method for manufacturing the same, and an electrochemical device including the same.

BACKGROUND ART

As used herein, the term "electrochemical device" encompasses a power-generating device (e.g., a fuel cell) and an energy-saving device (e.g., a redox flow battery: RFB).

A fuel cell that generates electricity through bonding between hydrogen and oxygen has advantages of continuously generating electricity as long as hydrogen and oxygen are supplied and having efficiency about twice as high as that of an internal combustion engine, because no heat is lost.

In addition, the fuel cell emits fewer pollutants because it directly converts the chemical energy generated by bonding between hydrogen and oxygen into electrical energy. Accordingly, the fuel cell has advantages of being environmentally friendly and alleviating concern over resource depletion caused by increased energy consumption.

A stack that actually generates electricity in the fuel cell has a stacked structure of several to dozens of unit cells, each including a membrane-electrode assembly (MEA) and a separator (also referred to as a "bipolar plate"). The membrane-electrode assembly generally includes an anode, a cathode, and an electrolyte membrane interposed therebetween.

The fuel cell may be classified into an alkaline electrolyte fuel cell, a polymer electrolyte fuel cell (PEMFC), and the like, depending on the state and type of the electrolyte. Among them, the polymer electrolyte fuel cell is receiving attention as a portable, vehicular or domestic power supply due to the advantages of a low operating temperature of less than 100 °C, quick start-up, rapid response, and excellent durability.

Typical examples of the polymer electrolyte fuel cell include a proton exchange membrane fuel cell (PEMFC), which uses hydrogen gas as a fuel, a direct methanol fuel cell (DMFC), which uses liquid methanol as a fuel, and the like.

The reaction occurring in the polymer electrolyte fuel cell will be briefly described.

First, when a fuel such as hydrogen gas is supplied to an anode, the hydrogen is oxidized to produce a proton ($H^+$) and an electron ($e^-$). The produced proton is transferred to the cathode through the polymer electrolyte membrane, whereas the produced electron is transferred to the cathode through an external circuit. Oxygen supplied to the cathode is bonded to the proton and the electron and is thus reduced, thereby producing water.

In order to realize the commercialization of fuel cells (particularly fuel cells for transportation), it is most important to secure mechanical durability during long-term operation. In general, the mechanical durability of a fuel cell greatly depends on the mechanical durability of a polymer electrolyte membrane, which repeatedly swells and contracts in response to changes in humidity.

A redox flow battery (RFB) is a secondary battery that can be used for a long time by being repeatedly charged and discharged through a reversible electrochemical reaction involving an electrolyte.

The redox flow battery (RFB) generally includes two types of liquid electrolytes, which are isolated from each other via a polymer electrolyte membrane. A first liquid electrolyte reaction at an anode is different from a second liquid electrolyte reaction at a cathode, causing a difference in pressure. In order to overcome this pressure difference and exhibit excellent battery performance even after repeated charging and discharging, the polymer electrolyte membrane requires high ionic conductivity and excellent mechanical durability.

In an attempt to improve the mechanical durability of the polymer electrolyte membrane, a reinforced composite membrane-type polymer electrolyte membrane produced by impregnating a porous support with an ion conductor dispersion has been proposed. However, as the thickness of the porous support increases, the electrical performance of the polymer electrolyte membrane, such as ion conductivity thereof, deteriorates, so the thickness of the porous support cannot be increased indefinitely. Therefore, there is a limitation to the improvement in mechanical durability of the polymer electrolyte membrane that can be achieved by controlling the thickness of the porous support.

In an attempt to increase mechanical durability by reducing swelling and contraction of the polymer electrolyte membrane caused by humidity changes by lowering the solubility of the ion conductor in water, it has been suggested to induce a crosslink structure of the ion conductor through addition of metal ions. However, a plurality of ion exchange groups of the ion conductor binds to one metal ion, and loses hydrogen and thus ion-transport ability thereof when binding thereto, so the number of ion exchange groups capable of performing ion transport greatly decreases. As a result, the electrical performance of the polymer electrolyte membrane is deteriorated.

In another attempt to increase the mechanical durability of the polymer electrolyte membrane, it has been suggested to use an ion conductor having an intramolecular crosslink structure. However, such an ion conductor is inapplicable to a reinforced composite membrane-type polymer electrolyte membrane including a porous support impregnated with an ion conductor because (i) separate complicated processes are required in order to manufacture the ion conductor having an intramolecular crosslink structure, and (ii) the ionic conductor having an intra-molecular crosslink structure has relatively low fluidity, and (iii) causes deterioration in the flexibility of the polymer electrolyte membrane.

US Patent No. 2005/004834 A1 proposes improving the mechanical durability of a polymer electrolyte membrane by inducing a crosslink structure by a covalent bond through polycondensation between an ion exchange group of an ion conductor and a hydroxyl group or an amine group of a crosslinking agent. However, since the ion exchange group of the ion conductor loses hydrogen and thus ion transport ability is lost when the polycondensation reaction is performed, a decrease in the ion conductivity of the polymer electrolyte membrane cannot be avoided.

DISCLOSURE

Technical Problem

Therefore, the present disclosure is directed to a polymer electrolyte membrane capable of preventing the problems caused by the limitations and drawbacks of the prior art, a method for manufacturing the same, and a membrane electrode assembly including the same.

It is one aspect of the present disclosure to provide a polymer electrolyte membrane having excellent flexibility, high ionic conductivity, and superior mechanical durability.

It is another aspect of the present disclosure to provide a method for manufacturing a polymer electrolyte membrane having excellent flexibility, high ionic conductivity, and superior mechanical durability.

It is another aspect of the present disclosure to provide an electrochemical device that has excellent mechanical durability and thus is capable of maintaining superior performance for a long time.

In addition to the aspects of the present disclosure described above, other features and advantages of the present disclosure will be disclosed in the following detailed description, as will be clearly understood by those skilled in the art to which the present disclosure pertains.

Technical Solution

In accordance with one aspect of the present disclosure, provided is a polymer electrolyte membrane including a polymer electrolyte material, the polymer electrolyte material containing an ion conductor having an ion exchange group, and an organic compound binding to the ion exchange group through an ionic bond or a hydrogen bond to impart an ionic crosslink structure or a hydrogen-bond crosslink structure to the polymer electrolyte material.

The polymer electrolyte material may be soluble in dimethylacetamide (DMAc) solvent.

The ion exchange group may be a proton exchange group selected from the group consisting of a sulfonic group, a carboxyl group, a boronic group, a phosphoric group, an imide group, a sulfonimide group, a sulfonamide group, and a sulfonyl fluoride group.

The ion conductor may be a fluorinated ion conductor or a hydrocarbon ion conductor.

The organic compound may have at least one functional group selected from the group consisting of a carbonyl group (—CO—), a hydroxyl group (—OH), a carboxyl group (—COOH), a nitro group (—$NO_2$), and an amine group (—$NR^1R^2$), wherein $R^1$ and $R^2$ are each independently H, a substituted or unsubstituted alkyl group having 1 to 6 carbon atoms, or an aryl group having 6 to 12 carbon atoms, or are bound to each other to form a heterocycle having 2 to 5 carbon atoms.

The organic compound may be an aromatic compound or an alicyclic compound.

The organic compound may be a heterocyclic compound or a homocyclic compound.

The organic compound may be substituted or unsubstituted benzoquinone, substituted or unsubstituted naphthoquinone, substituted or unsubstituted dihydroxybenzene, substituted or unsubstituted benzenedicarboxylic acid, substituted or unsubstituted aminophenol, substituted or unsubstituted phenylenediamine, substituted or unsubstituted bipyridine diamine, substituted or unsubstituted di(aminophenyl)amine, substituted or unsubstituted bipyrrole, substituted or unsubstituted salsalate, or a mixture of two or more thereof.

The organic compound may include at least one selected from the group consisting of the following compounds:

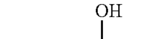
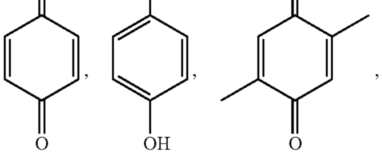
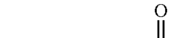
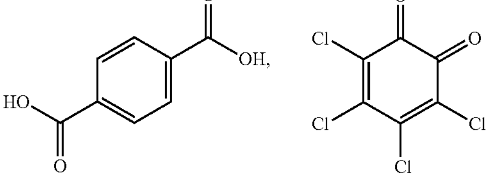
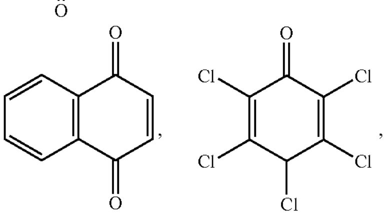
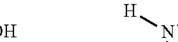
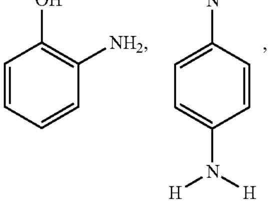
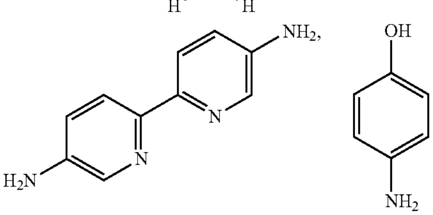
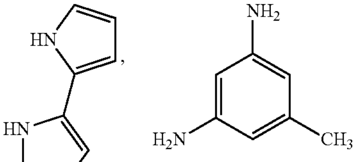
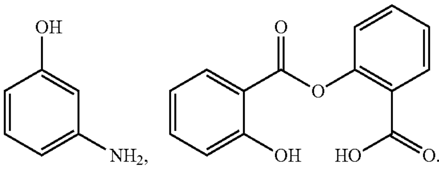

The polymer electrolyte membrane may further include a porous support having a plurality of pores, wherein the pores are filled with the polymer electrolyte material.

The porous support may be an expanded film or a nonwoven fibrous web.

A ratio of an apparent volume of the porous support to a total volume of the polymer electrolyte membrane may be 5 to 90%.

In accordance with another aspect of the present disclosure, provided is a method for manufacturing a polymer electrolyte membrane, the method including preparing a mixed solution containing an ion conductor having an ion exchange group, and an organic compound, and forming a polymer electrolyte membrane using the mixed solution, wherein the organic compound has a functional group capable of binding to the ion exchange group through an ionic bond or a hydrogen bond to form an ionic crosslink structure or a hydrogen-bond crosslink structure with the ion conductor.

The preparation of the mixed solution may include dissolving or dispersing the ion conductor in a first solvent to prepare a first solution, dissolving the organic compound in a second solvent to prepare a second solution, and mixing the second solution with the first solution.

The organic compound may have at least one functional group selected from the group consisting of a carbonyl group (—CO—), a hydroxyl group (—OH), a carboxyl group (—COOH), a nitro group (—$NO_2$), and an amine group (—$NR^1R^2$), wherein $R^1$ and $R^2$ are each independently H, a substituted or unsubstituted alkyl group having 1 to 6 carbon atoms, or an aryl group having 6 to 12 carbon atoms, or are bound to each other to form a heterocycle having 2 to 5 carbon atoms.

The organic compound may be an aromatic compound or an alicyclic compound.

The organic compound may be a heterocyclic compound or a homocyclic compound.

The organic compound may be substituted or unsubstituted benzoquinone, substituted or unsubstituted naphthoquinone, substituted or unsubstituted dihydroxybenzene, substituted or unsubstituted benzenedicarboxylic acid, substituted or unsubstituted aminophenol, substituted or unsubstituted phenylenediamine, substituted or unsubstituted bipyridine diamine, substituted or unsubstituted di(aminophenyl)amine, substituted or unsubstituted bipyrrole, substituted or unsubstituted salsalate, or a mixture of two or more thereof.

The organic compound may include at least one selected from the group consisting of the following compounds:

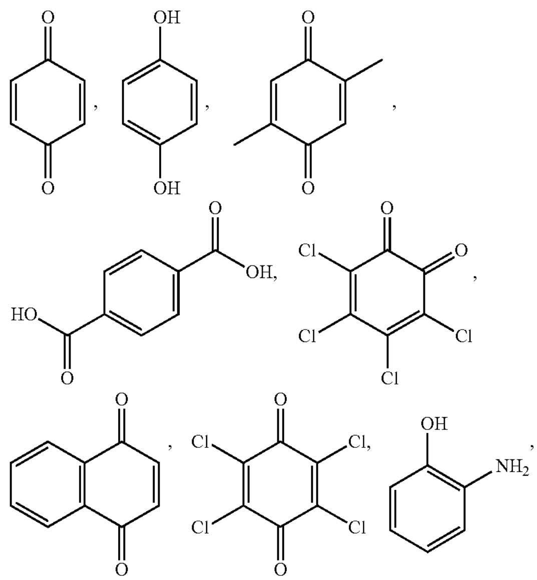

-continued

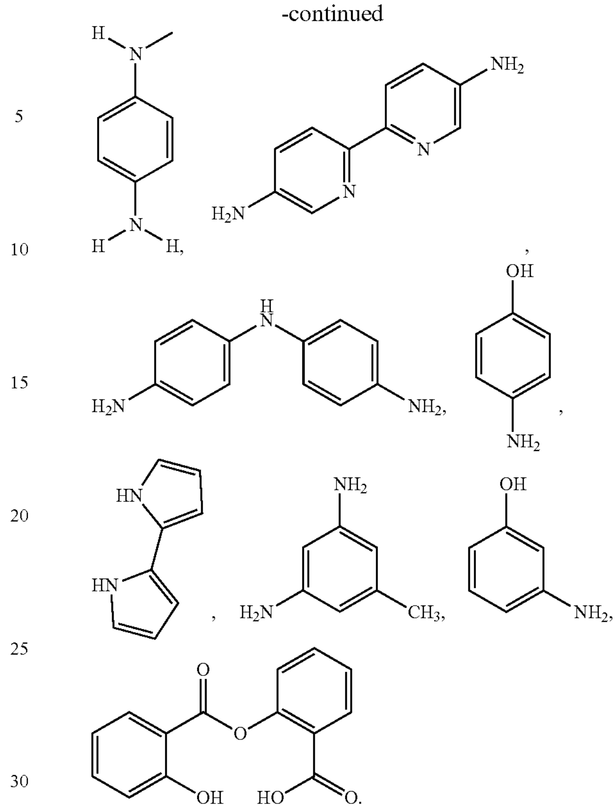

A weight of the organic compound in the mixed solution may be 0.01 to 20% of a total weight of the ion conductor and the organic compound.

The formation of the polymer electrolyte membrane using the mixed solution may include preparing a porous support, impregnating the porous support with the mixed solution, and drying the porous support impregnated with the mixed solution.

In accordance with another aspect of the present disclosure, provided is an electrochemical device including an anode, a cathode, and the polymer electrolyte membrane interposed between the anode and the cathode.

The general description of the present disclosure is provided only for illustration of the present disclosure and does not limit the scope of the present disclosure.

Advantageous Effects

In accordance with the present disclosure, the mechanical durability of the polymer electrolyte membrane can be improved without deterioration in electrical performance and flexibility, such as ionic conductivity, by manufacturing a polymer electrolyte membrane using an ion conductor solution or dispersion containing an organic compound having a functional group that can form an ionic bond or hydrogen bond with the ion exchange group of the ion conductor.

That is, according to the present disclosure, (i) the organic compound forms an ionic crosslink structure and/or a hydrogen-bond crosslink structure with the ion exchange group of the ion conductor, so the mechanical strength of the polymer electrolyte membrane can be improved, (ii) the organic compound has intrinsic ion conductivity owing to the ionic property thereof, and the ion exchange group of the ion conductor, which forms an ionic crosslink structure and/or a hydrogen-bond crosslink structure with the organic compound, does not lose ion transport ability because hydrogen, which can contribute to proton transport even after cross-linking, is retained, so a decrease in the ionic conductivity of the polymer electrolyte membrane to which cross-linking through metal ions or cross-linking based on covalent bonds is applied, which inevitably occurs in the prior art, can be prevented, and (iii) problems caused by the ion conductor of the prior art relating to an intramolecular crosslink structure or a covalent bond crosslink structure (e.g. inapplicability to reinforced composite membrane-type polymer electrolyte membranes, low flexibility of the polymer electrolyte membrane, etc.) can be avoided.

BEST MODE

Hereinafter, embodiments of the present disclosure will be described in detail with reference to the accompanying drawings. However, the following embodiments are illustratively provided merely for clear understanding of the present disclosure, and do not limit the scope of the present disclosure.

The polymer electrolyte membrane of the present disclosure includes a polymer electrolyte material.

The polymer electrolyte material contains an ion conductor having an ion exchange group and an organic compound.

The organic compound is bound to the ion exchange group through an ionic bond or a hydrogen bond, thus forming an ionic crosslink structure or a hydrogen-bond crosslink structure.

According to the present disclosure, since the polymer electrolyte material has an ionic crosslink structure or a hydrogen-bond crosslink structure, the ion exchange group of the ion conductor, which contributes to the formation of the crosslink structure, still retains hydrogen for contributing to proton transport even after cross-linking, thereby maintaining ion transport ability. Therefore, the polymer electrolyte membrane of the present disclosure has much better ion conductivity than the polymer electrolyte membrane of the prior art, in which the ion exchange group loses hydrogen when forming a covalent crosslink with the crosslinking agent, and consequently also loses ion transport ability.

The polymer electrolyte material of the present disclosure, having an ionic crosslink structure or a hydrogen-bond crosslink structure, is different from a polymer electrolyte material having a covalent crosslink structure in that it is soluble in a dimethylacetamide (DMAc) solvent.

In the present disclosure, whether the polymer electrolyte material is soluble or insoluble in the DMAc solvent is determined as follows.

0.1 g of the polymer electrolyte material is added to 10 g of a 99.5% DMAc solvent and stirred at 70 °C for 40 hours at 240 rpm, and the resulting mixture is filtered using filter paper (No. 2) from ADVANTEC. During filtration, the mixture is thoroughly filtered using additional 10 g of the identical solvent (DMAc), and the resulting filtrate is sufficiently dried until there is no change in weight. The weight of the residual solid obtained by drying the filtrate is measured.

In the present disclosure, the expression that the polymer electrolyte material is soluble in the DMAc solvent means that the residual rate, calculated using Equation 1 below, is 10% or more. On the other hand, a residual rate less than 10% means insolubility in a DMAc solvent.

$$\text{Residual rate (\%)}=(w_1/w_o)\times 100 \quad \text{Equation 1}$$

Here, $w_o$ is the initial weight of the polymer electrolyte material added to the DMAc solvent, and $w_1$ is the weight of the residual solid.

The ion exchange group of the ion conductor may be a proton exchange group selected from the group consisting of a sulfonic group, a carboxyl group, a boronic group, a phosphoric group, an imide group, a sulfonimide group, a sulfonamide group, and a sulfonyl fluoride group. Specifically, the ion conductor according to an embodiment of the present disclosure may be a proton conductor having a sulfonic group and/or a carboxyl group as the proton exchange group.

In addition, the ion conductor may be a fluorinated ion conductor, a hydrocarbon ion conductor, or a mixture thereof.

The fluorinated ion conductor may be a fluorinated polymer (e.g., poly(perfluorosulfonic acid) or poly(perfluorocarboxylic acid)) that has the proton exchange group in the side chain thereof and contains fluorine in the main chain thereof.

The hydrocarbon ion conductor may be a hydrocarbon polymer having the proton exchange group in a side chain thereof [e.g., sulfonated polyimide (S-PI), sulfonated polyarylethersulfone (S-PAES), sulfonated polyether ether ketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, or the like].

The organic compound may have a functional group that is capable of forming an ionic crosslink structure and/or a hydrogen-bond crosslink structure with the ion exchange group of the ion conductor.

For example, the organic compound may have at least one functional group selected from the group consisting of a carbonyl group (—CO—), a hydroxyl group (—OH), a carboxyl group (—COOH), a nitro group (—$NO_2$), and an amine group (—$NR^1R^2$), wherein $R^1$ and $R^2$ are each independently H, a substituted or unsubstituted alkyl group having 1 to 6 carbon atoms, or an aryl group having 6 to 12 carbon atoms, or are bound to each other to form a heterocycle having 2 to 5 carbon atoms.

The organic compound may be a cyclic compound. For example, the organic compound may be an aromatic compound or an alicyclic compound, and may be a heterocyclic compound or a homocyclic compound.

According to an embodiment of the present disclosure, the organic compound is substituted or unsubstituted benzoquinone, substituted or unsubstituted naphthoquinone, substituted or unsubstituted dihydroxybenzene, substituted or unsubstituted benzenedicarboxylic acid, substituted or unsubstituted aminophenol, substituted or unsubstituted phenylenediamine, substituted or unsubstituted bipyridine diamine, substituted or unsubstituted di(aminophenyl)amine, substituted or unsubstituted bipyrrole, substituted or unsubstituted salsalate, or a mixture of two or more thereof.

More specifically, the organic compound may include, but is not limited to, at least one selected from the group consisting of the following compounds:

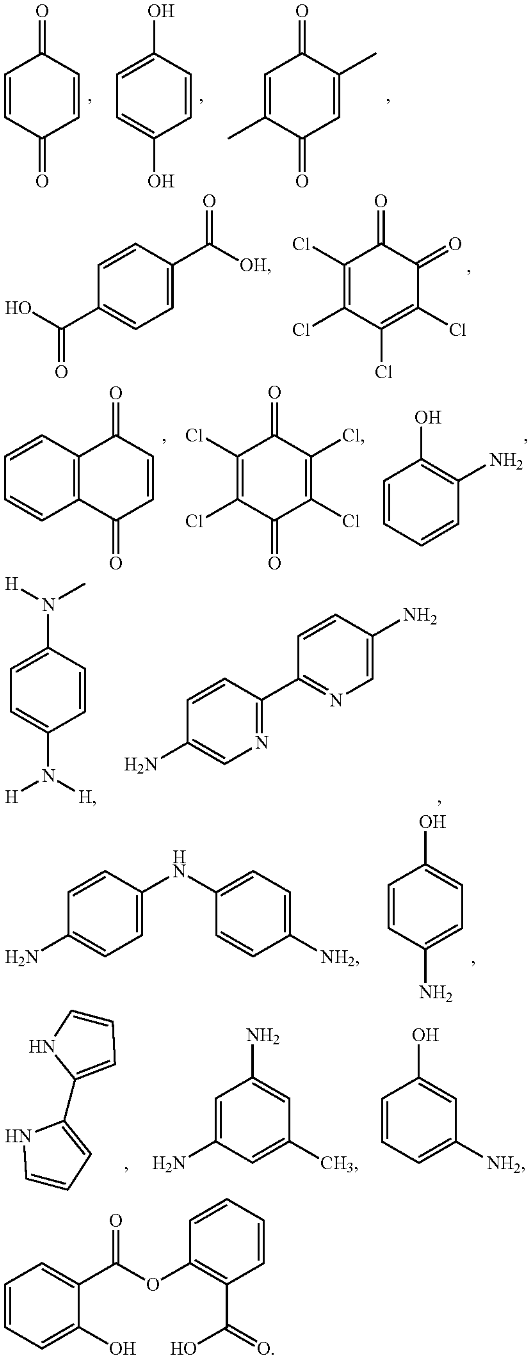

The polymer electrolyte membrane of the present disclosure may be (i) a single membrane formed of the polymer electrolyte material or (ii) a reinforced composite membrane including a porous support, the pores of which are filled with the polymer electrolyte material.

That is, the reinforced composite membrane-type polymer electrolyte membrane according to an embodiment of the present disclosure may further include a porous support having a plurality of pores filled with the polymer electrolyte material.

Since the polymer electrolyte material of the present disclosure has a crosslink structure formed through an ionic or hydrogen bond between the ion conductor and the organic compound, it has better fluidity than that of an ion conductor having an intramolecular crosslink structure. Accordingly, pores in the porous support can be easily filled with the polymer electrolyte material of the present disclosure. Accordingly, a water channel through which hydrogen ions can move is well formed in a through-plane direction of the porous support, so the reinforced composite electrolyte membrane can exhibit relatively excellent ionic conductivity.

According to an embodiment of the present disclosure, the porous support may be an expanded film or a nonwoven fibrous web.

The ratio of the apparent volume of the porous support to the total volume of the polymer electrolyte membrane may be 5 to 90%.

When the ratio is less than 5%, the effects of improving dimensional stability and mechanical durability that can be obtained by adopting the porous support are insufficient. On the other hand, when the ratio exceeds 90%, sheet resistance is increased due to the excessively small thickness of the ion conductor layer (i.e., the layer formed of only the polymer electrolyte material of the present disclosure) disposed on the upper or lower surface of the porous support. In this regard, more preferably, the ratio of the apparent volume of the porous support to the total volume of the polymer electrolyte membrane is 30 to 60%.

For the same reasons, the ratio of the thickness of the porous support to the total thickness of the polymer electrolyte membrane may be 5 to 90%, more preferably 30 to 60%.

The porous support according to an embodiment of the present disclosure may have a thickness of 1 to 50 μm.

When the thickness of the porous support is less than 1 μm, the mechanical strength of the polymer electrolyte membrane may be reduced. On the other hand, when the thickness of the porous support exceeds 50 μm, resistance loss may increase, and weight reduction and integration may be reduced. In this regard, the porous support preferably has a thickness of 2 to 40 μm, more preferably 3 to 30 μm, and still more preferably 3 to 20 μm.

The porosity of the porous support may be 45 to 90%, specifically 60 to 90%. When the porosity of the porous support is less than 45%, the amount of the ion conductor in the porous support is excessively low, so the resistance of the polymer electrolyte membrane increases and ionic conductivity decreases. On the other hand, when the porosity of the porous support exceeds 90%, morphological stability is lowered, so subsequent processing may not proceed smoothly.

The term "porosity" refers to the ratio of the volume of air in the porous support to the total volume of the porous support. The total volume of the porous support can be obtained by measuring the width, length, and thickness of a cuboid sample and multiplying these values, and the volume of air in the support can be obtained by subtracting the volume of the porous support material, obtained by dividing the mass of the sample by the density of the porous support material, from the total volume of the porous support.

Hereinafter, a method for manufacturing the polymer electrolyte membrane according to embodiments of the present disclosure will be described in detail.

The method for manufacturing a polymer electrolyte membrane includes preparing a mixed solution containing an ion conductor having an ion exchange group and an organic compound and forming a polymer electrolyte membrane using the mixed solution.

As described above, the organic compound has a functional group that is capable of binding to the ion exchange group of the ion conductor through an ionic bond or a hydrogen bond, thereby forming an ionic cross-link structure or a hydrogen-bond cross-link structure with the ion conductor.

The ion conductor and the organic compound have been described in detail above, and thus a duplicate description thereof will be omitted.

The mixed solution may be prepared by (i) dissolving the organic compound in a solution or dispersion of the ion conductor, (ii) dissolving or dispersing the ion conductor in the solution of the organic compound, or (iii) mixing the solution or dispersion of the ionic conductor with the solution of the organic compound.

According to an embodiment of the present disclosure, the mixed solution may be prepared by mixing the solution or dispersion of the ion conductor with the solution of the organic compound. That is, the preparing the mixed solution includes dissolving or dispersing the ion conductor in a first solvent to prepare a first solution ("solution" in a broad sense also includes dispersions), dissolving the organic compound in a second solvent to prepare a second solution, and mixing the second solution with the first solution.

The weight of the organic compound in the mixture may be 0.01 to 20% of the total weight of the ion conductor and the organic compound. When the weight ratio of the organic compound is less than 0.01%, a cross-link structure is not sufficiently formed, and the improvement in mechanical durability of the polymer electrolyte membrane is insufficient. On the other hand, when the weight ratio of the organic compound exceeds 20%, the organic compound may disadvantageously act as foreign matter that interferes with ion exchange in the polymer electrolyte membrane.

The first and second solvents may each independently be water, a hydrophilic solvent, an organic solvent, or a mixture of two or more thereof, and may be the same as or different from each other.

The hydrophilic solvent may contain a linear or branched saturated or unsaturated hydrocarbon having 1 to 12 carbon atoms as a main chain, and have at least one functional group selected from the group consisting of alcohol, isopropyl alcohol, ketone, aldehyde, carbonate, carboxylate, carboxylic acid, ether, and amide, and these may include an aromatic compound or an alicyclic compound as at least a part of the main chain.

The organic solvent may be N-methylpyrrolidone (NMP), dimethylsulfoxide (DMSO), tetrahydrofuran (THF), dimethylacetamide (DMAC), or a mixture of two or more thereof, but is not limited thereto.

Optionally, the mixed solution may further contain a radical scavenger as an additive. The radical scavenger is an additive that rapidly decomposes peroxides (especially hydrogen peroxide) and/or radicals (especially hydroxyl radicals) that are produced during the operation of the fuel cell and are the major cause of degradation of the ion conductor contained in the polymer electrolyte membrane or the catalyst layer of the anode/cathode. For example, the radical scavenger may be (i) at least one transition metal selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), molybdenum (Mo), lanthanum (La) and neodymium (Nd), (ii) at least one noble metal selected from the group consisting of silver (Au), platinum (Pt), ruthenium (Ru), palladium (Pd), and rhodium (Rh), (iii) an ion of the transition metal or noble metal, (iv) a salt of the transition metal or noble metal, and/or (iv) an oxide of the transition metal or noble metal.

As described above, the polymer electrolyte membrane of the present disclosure may be (i) a single membrane formed of the polymer electrolyte material or (ii) a reinforced composite membrane including a porous support, the pores of which are filled with the polymer electrolyte material.

In order to produce a reinforced composite membrane-type polymer electrolyte membrane, the formation of a polymer electrolyte membrane using the mixed solution includes preparing a porous support, impregnating the porous support with the mixed solution, and drying the porous support impregnated with the mixed solution.

As described above, the porous support may be an expanded film or a nonwoven fibrous web.

The expanded film may be manufactured by molding a support-forming liquid containing a fluorinated polymer, for example, polytetrafluoroethylene (PTFE), into a film and expanding the film to form a plurality of pores in the film.

The nonwoven web may be formed with a support-forming liquid containing a hydrocarbon polymer such as polyolefin (e.g., polyethylene, polypropylene, polybutylene, etc.), polyester (e.g. PET, PBT, etc.), polyamide (e.g., nylon-6, nylon-6,6, aramid, etc.), polyamic acid (converted to polyimide through imidization after being molded into a web), polyurethane, polybutene, polylactic acid, polyvinyl alcohol, polyphenylene sulfide (PPS), polysulfone, fluid crystalline polymer, polyethylene-co-vinyl acetate, polyacrylonitrile, cyclic polyolefin, polyoxymethylene, and polyolefin thermoplastic elastomers.

The nonwoven web may be produced using a method such as wet-laying, electrospinning, carding, garneting, air-laying, melt blowing, spunbonding, or stitch bonding.

Then, the produced porous support is impregnated with the mixed solution. The impregnation may be performed by (i) casting the mixed solution on a substrate and then adding the porous support on the casted mixed solution, or (ii) coating the porous support with the mixed solution. The coating may be performed, for example, using bar coating, comma coating, slot die coating, screen printing, spray coating, doctor blade coating, or the like.

Then, in order to remove the solvent and the dispersion medium, the porous support impregnated with the mixed solution is dried.

Hereinafter, the membrane electrode assembly of the present disclosure will be described in detail.

The membrane electrode assembly of the present disclosure includes an anode, a cathode, and the polymer electrolyte membrane according to the present disclosure, interposed between the anode and the cathode.

At the anode to which hydrogen gas is supplied, the hydrogen is oxidized to produce a proton ($H^+$) and an electron ($e^-$). The produced proton is transferred to the cathode through the polymer electrolyte membrane, whereas the produced electron is transferred to the cathode through an external circuit.

At the cathode to which oxygen is supplied, the oxygen is bonded to the proton and electron and is thus reduced, thereby producing water.

The anode and the cathode of the membrane electrode assembly of the present disclosure are not particularly limited, and a general anode and cathode of membrane electrode assemblies for fuel cells may be used herein.

Hereinafter, the present disclosure will be described in more detail with reference to specific examples. However, the following examples are provided only for better understanding of the present disclosure, and should not be construed as limiting the scope of the present disclosure.

EXAMPLE 1

1,4-benzoquinone was dissolved in a PFSA resin dispersion to prepare a mixed solution (weight ratio of PFSA:1,4-benzoquinone=95:5). An e-PTFE porous film having a thickness of about 12 μm was wetted with the mixed solution and then dried to produce a polymer electrolyte membrane.

EXAMPLE 2

A polymer electrolyte membrane was produced in the same manner as in Example 1, except that 1,4-benzenedicarboxylic acid (weight ratio of PFSA:1,4-benzenedicarboxylic acid=95:5) was used instead of 1,4-benzoquinone.

EXAMPLE 3

A polymer electrolyte membrane was produced in the same manner as in Example 1, except that 2,2'-bipyridine-5,5'-diamine (weight ratio of PFSA:2,2'-bipyridine-5,5'-diamine=95:5) was used instead of 1,4-benzoquinone.

EXAMPLE 4

A polymer electrolyte membrane was produced in the same manner as in Example 1, except that 4-aminophenol (weight ratio of PFSA:4-aminophenol=95:5) was used instead of 1,4-benzoquinone.

EXAMPLE 5

A polymer electrolyte membrane was produced in the same manner as in Example 1, except that salsalate (weight ratio of PFSA:salsalate=95:5) was used instead of 1,4-benzoquinone.

EXAMPLE 6

A polymer electrolyte membrane was produced in the same manner as in Example 1, except that a 10 wt % sulfonated polyarylethersulfone (S-PAES) solution (solvent: DMAc) was used instead of the PFSA resin dispersion.

Comparative Example 1

A polymer electrolyte membrane was produced in the same manner as in Example 1, except that the e-PTFE porous film was wetted with a PFSA resin dispersion, instead of the mixed solution.

Comparative Example 2

A polymer electrolyte membrane was produced in the same manner as in Example 1, except that the e-PTFE porous film was wetted with a 10 wt % sulfonated polyarylethersulfone (S-PAES) solution (solvent: DMAc), instead of the mixed solution.

Comparative Example 3

A polymer electrolyte membrane was produced in the same manner as in Example 1, except that $Ce(NO_3)_3$ (weight ratio of PFSA:$Ce(NO_3)_3$=95:5) was used instead of 1,4-benzoquinone.

Comparative Example 4

A polymer electrolyte membrane was produced in the same manner as in Example 6, except that $Ce(NO_3)_3$ (weight ratio of PFSA:$Ce(NO_3)_3$=95:5) was used instead of 1,4-benzoquinone.

The swelling rate, tensile strength, elongation, and ionic conductivity of each of the polymer electrolyte membranes produced in Examples and Comparative Examples were evaluated and measured in the following manner, and the results are shown in Table 1 below.

[Swelling Rate]

A sample 50 mm×50 mm in size was immersed in distilled water at room temperature for 12 hours, the wet sample was taken out, and the length in the MD direction and the length in the TD direction were measured. Then, the sample was dried in a vacuum at 50 °C for 24 hours, and then the length in the MD direction and the length in the TD direction were measured. Then, the MD swelling rate and the TD swelling rate were calculated using the following equations.

$$*MD\text{ swelling rate }(\%)=[(L_{wet}(MD)-L_{dry}(MD))/]\times 100$$

$$*TD\text{ swelling rate }(\%)=[(L_{wet}(TD)-L_{dry}(TD))/]\times 100$$

Here, $L_{wet}$(MD) and $L_{wet}$(TD) are, respectively, the length in the MD direction and the length in the TD direction of the sample, measured immediately before drying, and $L_{dry}$(MD) and $L_{dry}$(TD) are, respectively, the length in the MD direction and the length in the TD direction of the sample, measured immediately after drying.

[Tensile Strength & Tensile Elongation]

A sample of 50 mm×50 mm in size was prepared, and the tensile strength and tensile elongation of the sample in each of the MD direction and the TD direction were measured using a universal testing machine (UTM) (Instron 5966) under the following conditions according to ASTM D624.

Temperature: 23±2 °C

Relative humidity: 50±5%

Test speed: 500±50 mm/min

[In-Plane Ionic Conductivity]

The in-plane (IP) ionic conductivity of the polymer electrolyte membrane was measured at 80 °C and 50% RH using a magnetic suspension balance (Bell Japan).

Specifically, the difference in AC potential generated in the sample (10 mm×30 mm) was measured while an AC current was applied to both sides of the sample under conditions of 80° C and 50% RH to obtain a membrane resistance (R) (Ω). Then, the in-plane ionic conductivity of the polymer electrolyte membrane 100 was calculated using the following equation.

$$*\sigma=L/[R\times A]$$

Here, σ is the in-plane ionic conductivity (S/cm), L is the distance between the electrodes (cm), R is the membrane resistance (Ω), and A is the effective area of the membrane ($cm^2$).

TABLE 1

| | Ionic conductor | Organic compound | Swelling rate (%) (MD/TD) | Tensile strength (MPa) (MD/TD) | Tensile elongation (%) (MD/TD) | In-plane ionic conductivity (S/cm) |
|---|---|---|---|---|---|---|
| Example 1 | PFSA | 1,4-benzoquinone | 16/16 | 24/24 | 55/55 | 0.055 |
| Example 2 | PFSA | 1,4-benzenedicarboxylic acid | 15/15 | 25/25 | 52/52 | 0.054 |
| Example 3 | PFSA | 2,2'-bipyridine-5,5'-diamine | 16/17 | 23/23 | 55/55 | 0.054 |
| Example 4 | PFSA | 4-aminophenol | 16/16 | 23/23 | 55/55 | 0.054 |
| Example 5 | PFSA | Salsalate | 15/15 | 25/25 | 53/53 | 0.055 |
| Example 6 | S-PAES | 1,4-benzoquinone | 18/18 | 44/45 | 30/30 | 0.047 |
| Comparative Example 1 | PFSA | — | 18/18 | 20/20 | 60/60 | 0.055 |
| Comparative Example 2 | S-PAES | — | 20/20 | 40/40 | 30/30 | 0.047 |
| Comparative Example 3 | PFSA | $Ce(NO_3)_3$ | 17/18 | 21/20 | 60/60 | 0.048 |
| Comparative Example 4 | S-PAES | $Ce(NO_3)_3$ | 20/20 | 43/43 | 30/30 | 0.042 |

As can be seen from Table 1 above, the polymer electrolyte membranes of Examples 1 to 5, in which the organic compounds of the present disclosure were added to PFSA, which is a fluorinated ion conductor, exhibited much better mechanical durability (i.e., lower swelling rate and higher tensile strength), despite having ionic conductivity that is the same as or similar to that of the polymer electrolyte membrane of Comparative Example 1, in which no material for forming a crosslink structure was added to the PFSA.

In addition, the polymer electrolyte membranes of Examples 1 to 5, in which the organic compounds of the present disclosure were added to PFSA, exhibited much better mechanical durability (i.e., lower swelling rate and higher tensile strength) and much higher ionic conductivity than the polymer electrolyte membrane of Comparative Example 3, in which metal ions ($Ce^{3+}$), instead of the organic compound of the present disclosure, were added to PFSA. That is, in Comparative Example 3, the ion exchange group of the ion conductor lost hydrogen while binding to metal ions and lost ion transport ability, so the number of ion exchange groups capable of performing ion transport decreased, and the ion conductivity of the polymer electrolyte membrane also decreased. On the other hand, in Examples 1 to 5 of the present disclosure, ion transport ability was not lost, so the polymer electrolyte membrane had relatively high ionic conductivity (i.e., ionic conductivity the same as or similar to that of the polymer electrolyte membrane of Comparative Example 1, in which no material for forming a crosslink structure was added to the PFSA).

In addition, the hydrocarbon ion conductor as well as the fluorinated ion conductor had the above-described advantageous effects due to the addition of the organic compound of the present disclosure. That is, the polymer electrolyte membrane of Example 5, in which 1,4-benzoquinone, which is one of the organic compounds of the present disclosure, was added to S-PAES, which is a hydrocarbon ion conductor, also exhibited i) much better mechanical durability (i.e., a lower swelling rate and higher tensile strength) despite having the same ionic conductivity as that of the polymer electrolyte membrane of Comparative Example 2, in which no material for forming a crosslink structure was added to the PFSA, and ii) much better mechanical durability (i.e., a lower swelling rate and higher tensile strength) and much higher ionic conductivity than that of the polymer electrolyte membrane of Comparative Example 4, in which metal ions ($Ce^{3+}$), instead of 1,4-benzoquinone, were added to PFSA.

The invention claimed is:

1. A polymer electrolyte membrane comprising a polymer electrolyte material,
- the polymer electrolyte material comprising:
- an ion conductor having an ion exchange group; and
- an organic compound binding to the ion exchange group through an ionic bond or a hydrogen bond to impart an ionic crosslink structure or a hydrogen-bond crosslink structure to the polymer electrolyte material,
- wherein the organic compound is substituted or unsubstituted benzenedicarboxylic acid, substituted or unsubstituted aminophenol, substituted or unsubstituted phenylenediamine, substituted of unsubstituted bipyridine diamine, substituted or unsubstituted di(aminophenyl)amine, substituted or unsubstituted bipyrrole, substituted or unsubstituted salsalate, or a mixture of two or more thereof.

2. The polymer electrolyte membrane according to claim 1, wherein the polymer electrolyte material is soluble in dimethylacetamide (DMAc) solvent.

3. The polymer electrolyte membrane according to claim 1, wherein the ion exchange group is a proton exchange group selected from the group consisting of a sulfonic group, a carboxyl group, a boronic group, a phosphoric group, an imide group, a sulfonimide group, a sulfonamide group, and a sulfonyl fluoride group.

4. The polymer electrolyte membrane according to claim 1, wherein the organic compound has at least one functional group selected from the group consisting of a carbonyl group (—CO—), a hydroxyl group (—OH), a carboxyl group (—COOH), a nitro group (—$NO_2$), and an amine group (—$NR^1R^2$),
- wherein $R^1$ and $R^2$ are each independently H, a substituted or unsubstituted alkyl group having 1 to 6 carbon atoms, or an aryl group having 6 to 12 carbon atoms, or are bound to each other to form a heterocycle having 2 to 5 carbon atoms.

5. The polymer electrolyte membrane according to claim 1, wherein the organic compound comprises at least one selected from the group consisting of the following compounds:

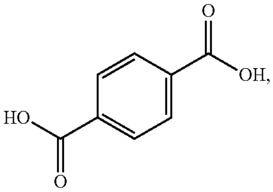 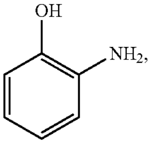

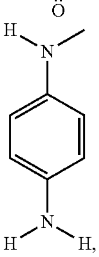 

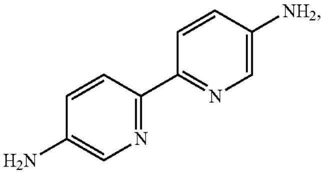

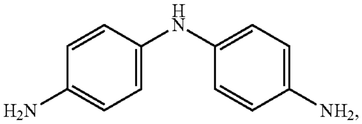 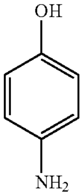 ,

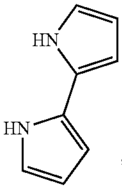 , 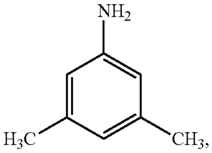 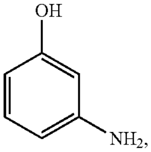

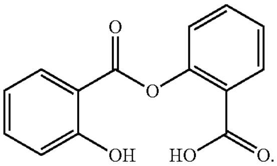

6. The polymer electrolyte membrane according to claim 1, further comprising a porous support having a plurality of pores, wherein the pores are filled with the polymer electrolyte material.

7. The polymer electrolyte membrane according to claim 6, wherein a ratio of an apparent volume of the porous support to a total volume of the polymer electrolyte membrane is 5 to 90%.

8. A method for manufacturing a polymer electrolyte membrane, the method comprising:

preparing a mixed solution comprising an ion conductor having an ion exchange group, and an organic compound; and forming a polymer electrolyte membrane using the mixed solution, wherein the organic compound has a functional group capable of binding to the ion exchange group through an ionic bond or a hydrogen bond to form an ionic crosslink structure or a hydrogen-bond crosslink structure with the ion conductor, and wherein the organic compound is substituted or unsubstituted benzenedicarboxylic acid, substituted or unsubstituted aminophenol, substituted or unsubstituted phenylenediamine, substituted or unsubstituted bipyridine diamine, substituted or unsubstituted di(aminophenyl)amine, substituted or unsubstituted bipyrrole, substituted or unsubstituted salsalate, or a mixture of two or more thereof.

9. The method according to claim 8, wherein the preparation of the mixed solution comprises:

dissolving or dispersing the ion conductor in a first solvent to prepare a first solution;

dissolving the organic compound in a second solvent to prepare a second solution; and mixing the second solution with the first solution.

10. The method according to claim 8, wherein the organic compound has at least one functional group selected from the group consisting of a carbonyl group (—CO—), a hydroxyl group (—OH), a carboxyl group (—COOH), a nitro group (—$NO_2$), and an amine group (—$NR^1R^2$), wherein $R^1$ and $R^2$ are each independently H, a substituted or unsubstituted alkyl group having 1 to 6 carbon atoms, or an aryl group having 6 to 12 carbon atoms, or are bound to each other to form a heterocycle having 2 to 5 carbon atoms.

11. The method according to claim 8, wherein the organic compound comprises at least one selected from the group consisting of the following compounds:

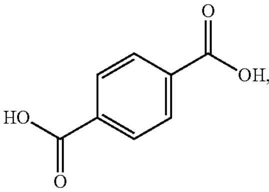 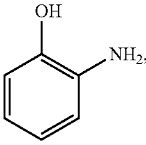

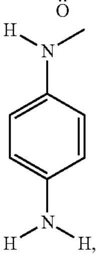 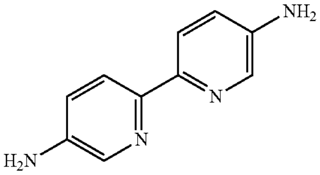 ,

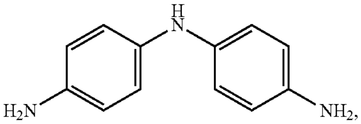 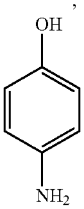 ,

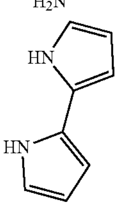 , 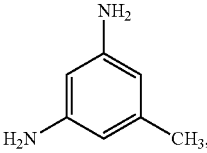 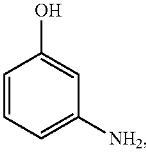

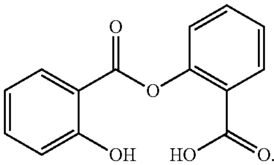

12. The method according to claim 8, wherein a weight of the organic compound in the mixed solution is 0.01 to 20% of a total weight of the ion conductor and the organic compound.

13. The method according to claim 8, wherein the formation of the polymer electrolyte membrane using the mixed solution comprises:

preparing a porous support;

impregnating the porous support with the mixed solution; and drying the porous support impregnated with the mixed solution.

14. An electrochemical device comprising:

an anode;

a cathode; and the polymer electrolyte membrane according to claim 1, interposed between the anode and the cathode.

* * * * *